(12) United States Patent
Hensley et al.

(10) Patent No.: US 10,743,614 B2
(45) Date of Patent: *Aug. 18, 2020

(54) METHOD OF MANUFACTURING A BLADDER ELEMENT WITH AN IMPRESSION OF ETCHED AREA OF MOLD ASSEMBLY AND ARTICLE HAVING BLADDER ELEMENT WITH IMPRESSION

(71) Applicant: NIKE, Inc., Beaverton, OR (US)

(72) Inventors: Taryn Hensley, Portland, OR (US); Dervin A. James, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/819,414

(22) Filed: Nov. 21, 2017

(65) Prior Publication Data

US 2018/0070676 A1 Mar. 15, 2018

Related U.S. Application Data

(63) Continuation of application No. 15/093,090, filed on Apr. 7, 2016, now Pat. No. 9,854,870.

(Continued)

(51) Int. Cl.
| | |
|---|---|
| *A43B 13/20* | (2006.01) |
| *B29D 35/12* | (2010.01) |
| *A43B 3/00* | (2006.01) |
| *A43B 13/12* | (2006.01) |
| *A43B 1/00* | (2006.01) |

(Continued)

(52) U.S. Cl.
CPC ............ *A43B 13/20* (2013.01); *A43B 1/0072* (2013.01); *A43B 3/0078* (2013.01); *A43B 13/12* (2013.01); *A43B 13/203* (2013.01); *A43B 23/24* (2013.01); *B29C 33/3842* (2013.01); *B29C 33/42* (2013.01); *B29D 35/122* (2013.01); *B29D 35/128* (2013.01); *B29D 35/142* (2013.01); *B29D 35/148* (2013.01); *B29K 2023/086* (2013.01); *B29K 2075/00* (2013.01); *B29K 2995/0067* (2013.01)

(58) Field of Classification Search
CPC .................... A43B 13/20; A43B 13/12–13/14
See application file for complete search history.

(56) References Cited

U.S. PATENT DOCUMENTS

| | | | | |
|---|---|---|---|---|
| 4,571,853 | A * | 2/1986 | Medrano | ................ A43B 17/08 36/29 |
| 5,042,176 | A * | 8/1991 | Rudy | ................... A43B 13/203 36/153 |

(Continued)

FOREIGN PATENT DOCUMENTS

| | | |
|---|---|---|
| CN | 2183195 Y | 11/1994 |
| CN | 101863394 A | 10/2010 |
| CN | 102085026 A | 6/2011 |

*Primary Examiner* — Jila M Mohandesi
(74) *Attorney, Agent, or Firm* — Quinn IP Law (57) ABSTRACT

An article of footwear includes a sole assembly with a midsole and an outsole. The midsole includes a fluid-filled bladder element including a first polymeric sheet that has a surface with an impression. The fluid-filled bladder element has a sealable internal cavity that retains fluid. A first portion of the bladder element with the impression is exposed to view through one of the midsole, the outsole, or an upper. A second portion of the bladder element is blocked from view by said one of the midsole, the outsole, or the upper.

15 Claims, 7 Drawing Sheets

Related U.S. Application Data

(60) Provisional application No. 62/144,571, filed on Apr. 8, 2015.

(51) Int. Cl.

| | | |
|---|---|---|
| *A43B 23/24* | (2006.01) | |
| *B29D 35/14* | (2010.01) | |
| *B29C 33/38* | (2006.01) | |
| *B29C 33/42* | (2006.01) | |
| *B29K 23/00* | (2006.01) | |
| *B29K 75/00* | (2006.01) | |

(56) References Cited

U.S. PATENT DOCUMENTS

| | | | |
|---|---|---|---|
| 5,083,361 A * | 1/1992 | Rudy | A43B 13/189 |
| | | | 29/454 |
| 5,092,060 A | 3/1992 | Frachey et al. | |
| 5,968,657 A | 10/1999 | Scullin et al. | |
| 5,989,675 A * | 11/1999 | Chen | B22C 7/00 |
| | | | 428/143 |
| 6,031,019 A | 2/2000 | Tsutsumi et al. | |
| 6,129,799 A * | 10/2000 | McGraw | B29C 66/242 |
| | | | 156/87 |
| 6,303,198 B1 | 10/2001 | Chen | |
| 6,790,391 B2 * | 9/2004 | Watkins | A43B 13/189 |
| | | | 264/280 |
| 7,879,417 B2 * | 2/2011 | Rudy | A43B 13/206 |
| | | | 428/35.7 |
| 7,917,981 B1 | 4/2011 | Lakic | |
| 8,813,389 B2 | 8/2014 | Gishifu et al. | |
| 9,854,870 B2 * | 1/2018 | Hensley | A43B 13/12 |
| 9,974,360 B2 * | 5/2018 | Hensley | B29B 13/08 |
| 10,327,506 B2 * | 6/2019 | Hensley | A43B 13/12 |
| 10,517,352 B2 * | 12/2019 | Hensley | B29C 49/4252 |
| 2002/0050077 A1 | 5/2002 | Wang et al. | |
| 2004/0045192 A1 | 3/2004 | Lin | |
| 2004/0071936 A1 * | 4/2004 | Martelli | B29C 33/424 |
| | | | 428/141 |
| 2011/0005101 A1 | 1/2011 | Sills | |
| 2011/0067263 A1 | 3/2011 | Wyszynski et al. | |
| 2011/0197470 A1 | 8/2011 | Caron et al. | |
| 2011/0271552 A1 | 11/2011 | Peyton | |
| 2011/0277352 A1 | 11/2011 | Diepenbrock et al. | |
| 2012/0055044 A1 | 3/2012 | Dojan et al. | |
| 2012/0084999 A1 * | 4/2012 | Davis | A43B 23/029 |
| | | | 36/93 |
| 2012/0102783 A1 | 5/2012 | Swigart et al. | |
| 2013/0055595 A1 | 3/2013 | Brown | |
| 2013/0191969 A1 | 8/2013 | Goloveyko | |
| 2014/0259749 A1 * | 9/2014 | Taylor | B29D 35/122 |
| | | | 36/29 |

* cited by examiner

FIG. 18

METHOD OF MANUFACTURING A BLADDER ELEMENT WITH AN IMPRESSION OF ETCHED AREA OF MOLD ASSEMBLY AND ARTICLE HAVING BLADDER ELEMENT WITH IMPRESSION

CROSS-REFERENCE TO RELATED APPLICATIONS

This application claims the benefit of priority to U.S. patent application Ser. No. 15/093,090 filed Apr. 7, 2016, which claims the benefit of U.S. Provisional Application No. 62/144,571 filed Apr. 8, 2015, and both of which are hereby incorporated by reference in their entirety.

TECHNICAL FIELD

The present teachings generally include an article that comprises a bladder element having a surface with an impression, and a method of manufacturing the bladder element from a mold assembly with an etched area.

BACKGROUND

Clothing, an accessory, and/or athletic wear are often a source of expression for the wearer. The clothing, accessory, and/or athletic wear may provide an association with a team, coordinate with another item, or provide the owner or user with an attractive or customized item.

Footwear typically includes a sole configured to be located under a wearer's foot to space the foot away from the ground or floor surface. Footwear sometimes utilizes polyurethane foam or other resilient materials in the sole to provide cushioning

DESCRIPTION

A method of manufacturing an article includes disposing polymeric material in a mold assembly that has a mold surface. The mold surface has an etched area. The method further comprises forming a fluid-filled bladder element at least partially by conforming the polymeric material to the mold surface. The conforming imparts an impression of the etched area on a surface of the fluid-filled bladder element. The method includes assembling the fluid-filled bladder element in the article so that a first portion of the fluid-filled bladder element with the impression of the etched area is exposed to view, and a second portion of the fluid-filled bladder element is blocked from view by the article. The fluid-filled bladder element has a sealable internal cavity that retains fluid.

The article may have an opening, and the impression may be aligned with the opening, and exposed to view through the opening. For example, the article may be an article of footwear having a sole assembly and an upper, with the opening in one of the sole assembly and the upper. Assembling the fluid-filled bladder element in the article may comprise securing the fluid-filled bladder element to the sole assembly so that the impression is aligned with the opening and exposed to view through the opening. For example, the opening may be in a midsole or an outsole of the sole assembly. In an embodiment, the method may comprise securing an outsole, at least one portion of which is substantially transparent, to the fluid-filled bladder element so that the at least one portion of the outsole that is substantially transparent is aligned with the impression, and the impression is exposed to view through the at least one portion of the outsole that is substantially transparent.

The method may comprise etching the etched area in the mold surface by at least one of laser etching, mechanical etching, or chemical etching prior to conforming the polymeric material to the mold surface and imparting the impression. In some embodiments, the method may include applying a colored medium to the first polymeric sheet prior to imparting the impression, and disposing the polymeric material in the mold assembly may comprise positioning the first polymeric sheet in the mold assembly so that the impression of the etched area is adjacent to or on the colored medium on the first polymeric sheet. In other embodiments, a colored medium may be applied to the bladder element after it is formed. The impression may comprise at least one of a protrusion from or a recess in the surface of the bladder element. In one embodiment, a substantially transparent topcoat may be secured to the fluid-filled bladder element over the impression to protect the impression from damage and abrasion.

Etching of the etched area may be controlled in various ways to enable fluid retention in the internal cavity of the fluid-filled bladder element. For example, etching the etched area may be controlled so that the impression has a maximum depth into the first polymeric sheet of not more than about one-half of a first thickness of the first polymeric sheet. For example, if chemical etching is used, a depth of etching in the mold surface may be controlled at increments of 0.008 to 0.015 inches. In some embodiments, the first polymeric sheet comprises a gas barrier polymer. Etching the etched area may be controlled so that the gas barrier polymer is not compromised by the impression. As used herein, the gas barrier polymer is not compromised by the impression if the fluid retention ability of the fluid-filled bladder element is not decreased due to the etching. In other words, the gas transmission rate of the fluid-filled bladder element does not decrease due to the impression.

The method may further comprise polishing a first region of the mold surface to a first average surface roughness, wherein a second region of the mold surface has a second average surface roughness. The etched area is at least partially in at least one of the first region or the second region. The first average surface roughness may be at least ten percent greater than or at least ten percent less than the second average surface roughness. The surface of the fluid-filled bladder element has a first area corresponding with the first region of the mold surface and a second area corresponding with the second region of the mold surface.

The method may further comprise treating the surface of the fluid-filled bladder element to achieve at least one of a predetermined level of opacity, transparency, or luster of the fluid-filled bladder element. Treating the surface of the fluid-filled bladder element may be by at least one of heating the surface of the fluid-filled bladder element or applying a softening agent to the surface of the fluid-filled bladder element.

Conforming the polymeric material to the mold surface may be by any or all of blow-molding, compression forming, vacuum forming, or thermoforming. Additionally, the etched area may be at least partially on a curved portion of the mold surface so that the at least a portion of the surface of the fluid-filled bladder element with the impression of the etched area is a corresponding curved portion of the fluid-filled bladder element.

The method may further comprise inflating the bladder element by filling the sealable internal cavity with a fluid, and then sealing the sealable internal cavity so that the fluid is retained in the sealable internal cavity. In one embodiment, the fluid is a gas at or above ambient pressure. The fluid-filled bladder element may have a gas transmission rate for nitrogen of less than 10 cubic centimeters per square meter per atmosphere per day, or of less than 1 cubic centimeter per square meter per atmosphere per day.

The fluid-filled bladder element may be formed from various polymeric materials enabling fluid retention and the gas transmission rate as described. For example, the polymeric material may comprise at least a first polymeric sheet that comprises a thermoplastic polymeric material. In one embodiment, the thermoplastic polymeric material may be a thermoplastic polyurethane (TPU). In one embodiment, the TPU is present on at least an outer surface of the first polymeric sheet. The first polymeric sheet may comprise a multi-layer polymeric sheet. The multi-layer polymeric sheet may be a laminate membrane that comprises at least a first layer comprising the TPU, and at least a second layer comprising a gas barrier polymer. The gas barrier polymer may comprise an ethylene-vinyl alcohol copolymer. In one embodiment, the at least a first layer consists essentially of the TPU, and the at least a second layer consists essentially of the ethylene-vinyl alcohol copolymer.

The method may include forming a peripheral seam in the bladder element by bonding in the mold assembly. The peripheral seam at least partially seals the sealable internal cavity in the bladder element. The peripheral seam is spaced apart from the impression. The method may include assembling the peripheral bladder element in the article so that the impression is at least partially aligned with the opening in the article. Furthermore, the peripheral seam may be covered by the article.

Optionally, in addition to the impression on the first polymeric sheet, the method may include etching an etched feature on the first polymeric sheet prior to disposing the polymeric material on the mold assembly or after the bladder element is formed. Etching of the etched feature is controlled so that a gas barrier layer of the first polymeric sheet is not compromised by the etching. Furthermore, the etched feature may be at least partially aligned with the etched area of the mold assembly during disposing of the first polymeric sheet in the mold assembly so that the impression of the etched area is at least partially on the etched feature. The surface of the bladder element having the impression may be an outer surface. The etched feature may be on one of the outer surface or an inner surface of the bladder element. The method may further comprise applying a colored medium to the first polymeric sheet before or after the bladder element is formed, in which case at least one of the etched feature and the impression may be adjacent to or on the colored medium on the first polymeric sheet.

Within the scope of the present teachings, an article comprises a fluid-filled bladder element including a polymeric material that has a surface with an impression thereon. The fluid-filled bladder element has a sealable internal cavity that retains fluid. A first portion of the fluid-filled bladder element with the impression is exposed to view, and a second portion of the fluid-filled bladder element is blocked from view by the article. Stated differently, the impression is at least partially aligned with the opening and exposed to view through the opening.

The fluid-filled bladder element may be manufactured by disposing the polymeric material in a mold assembly, and then conforming the polymeric material to a mold surface of the mold assembly to at least partially form the fluid-filled bladder element, thereby imparting the impression of the etched area onto the surface of the fluid-filled bladder element. The etched area of the mold surface may be etched on the mold surface by at least one of laser etching, mechanical etching, or chemical etching.

The surface of the fluid-filled bladder element may have a first area corresponding with a first region of the mold surface and a second area corresponding with a second region of the mold surface. The impression is in at least one of the first area and the second area. The first region of the mold surface has a first average surface roughness and the second region of the mold surface has a second average surface roughness. The first average surface roughness is at least ten percent greater than or at least ten percent less than the second average surface roughness.

The polymeric material may be conformed to the mold surface by at least one of blow-molding, compression forming, vacuum forming, or thermoforming the polymeric material. The polymeric material may include a first polymeric sheet, and the article may further comprise a colored medium applied to the first polymeric sheet. The impression of the etched area may be adjacent to or on the colored medium on the first polymeric sheet. In one embodiment, the portion of the surface of the fluid-filled bladder element with the impression of the etched area is a curved portion of the fluid-filled bladder element that corresponds with the curved portion of the mold surface.

In one embodiment of the article, the fluid-filled bladder element has a seam that at least partially seals the sealable internal cavity. The impression is spaced apart from the peripheral seam. The peripheral seam may be covered by and blocked from view by the article.

As described with respect to the method, the polymeric material used to form the fluid-filled bladder element of the article may comprise a thermoplastic polymeric material. In one embodiment, the thermoplastic polymeric material may be a thermoplastic polyurethane (TPU). In one embodiment, the polymeric material includes a first polymeric sheet, and the TPU is present on at least an outer surface of the first polymeric sheet. The first polymeric sheet may comprise a multi-layer polymeric sheet. The multi-layer polymeric sheet may be a laminate membrane that comprises at least a first layer comprising the TPU, and at least a second layer comprising a gas barrier polymer. The gas barrier polymer may comprise an ethylene-vinyl alcohol copolymer. In one embodiment, the at least a first layer consists essentially of the TPU, and the at least a second layer consists essentially of the ethylene-vinyl alcohol copolymer. Additionally, in one embodiment, the fluid-filled bladder element may have a gas transmission rate for nitrogen of less than 10 cubic centimeters per square meter per atmosphere per day, or of less than 1 cubic centimeter per square meter per atmosphere per day. The sealable internal cavity may be filled with a gas at or above ambient pressure.

In various embodiments, the impression may comprise at least one of a protrusion from or a recess in the surface of the fluid-filled bladder element. For example, the polymeric material may comprise a first polymeric sheet that has a first thickness. The impression may have a maximum depth into the first polymeric sheet of not more than about one-half of the first thickness. For example, when the first polymeric sheet comprises a gas barrier layer, the maximum depth of the impression does not compromise the gas barrier layer. A substantially transparent topcoat may be secured to the fluid-filled bladder element over the impression.

In one embodiment, the surface of the fluid-filled bladder element has a treated area with at least one of a predetermined level of opacity, transparency, or luster. The polymeric material may comprise at least a first polymeric sheet, and a feature may be etched on the first polymeric sheet. The feature may be at least partially aligned with the impression. The surface of the fluid-filled bladder element having the impression may be an outer surface, and the feature may be on one of the outer surface or an inner surface of the bladder element. A colored medium may be applied to the first polymeric sheet, and at least one of the feature or the impression may be adjacent to or on the colored medium on the first polymeric sheet.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

Figure 1:
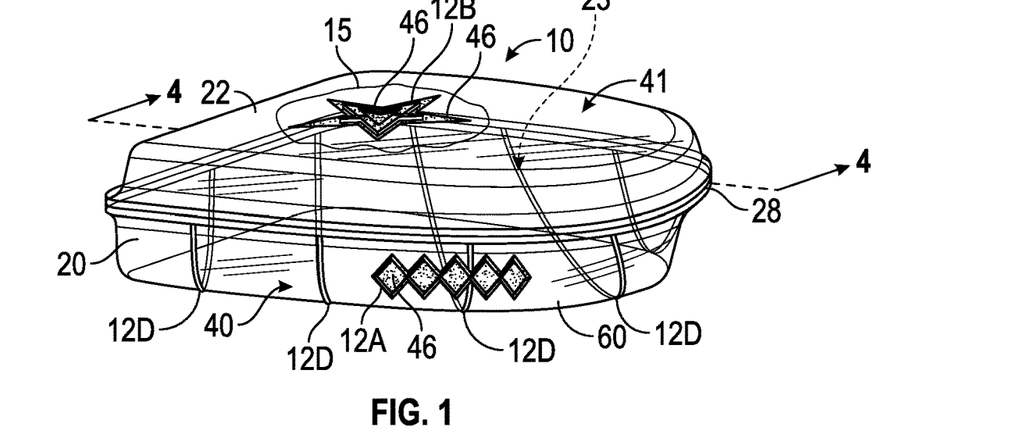
FIG. 1 is a schematic illustration in perspective view of a first embodiment of a bladder element having polymeric sheets with impressions and an etched feature.
Figure 2:
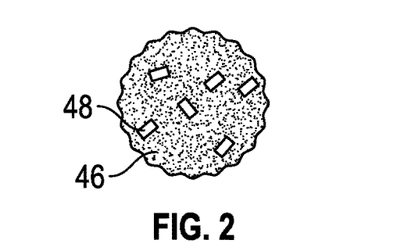
FIG. 2 is a schematic illustration in fragmentary view of a portion of colored medium applied to one of the polymeric sheets of FIG. 1.

Referring to the drawings, wherein like reference numbers refer to like components throughout the several views, FIGS. 1 and 2 show a fluid-filled bladder element 10 that has impressions 12B, 12C, 12D imparted thereon. As further explained herein, the impressions 12B, 12C, 12D are imparted from etched features of a mold assembly 32A, 32B, and because at least a portion of the fluid-filled bladder element 10 is substantially transparent, the impressions 12B, 12C, 12D can be viewed from an exterior of the fluid-filled bladder element 10 when the fluid-filled bladder element 10 is assembled in an article, such as the article of footwear 18 of FIG. 9. In the embodiment shown, the entire bladder element 10 is a substantially transparent polymeric material, and is formed from a first polymeric sheet 20 and a second polymeric sheet 22.

As used herein, a "fluid" includes a gas, including air, an inert gas such as nitrogen, or another gas. Accordingly, "fluid-filled" includes "gas-filled". As used herein, a component is "substantially transparent" if it has a luminous transmittance (i.e., a percentage of incident light that is transmitted) of at least 80 percent and haze (i.e., percentage of transmitted light that is scattered) of not more than 56 percent. The various materials used for the bladder element 10, and other embodiments of bladder elements discussed herein, may be substantially transparent. Those skilled in the art will readily understand a variety of methods to determine luminous transmittance and haze of an object, such as the bladder element 10. For example, the luminous transmittance and haze of the bladder element 10 can be determined according to American Society for Testing and Materials (ASTM) Standard D1003-00, Standard Test Method for Haze and Luminous Transmittance of Transparent Plastics. Additionally, in some embodiments, the bladder element 10 may have a tinted color.

Optionally, as further described herein, a colored medium 46 is aligned with and is adjacent to or on the impressions 12B and 12C. The colored medium 46 can be ink or paint, and may include reflective particles 48, as shown in the close-up view of FIG. 2. As indicated in the close-up view in FIG. 2, the colored medium 46 is an ink as a base and has reflective particles 48. The reflective particles 48 allow for light to be cast back towards its source. The reflective particles 48 may also allow light to be scattered. In such embodiments, this provides a safety feature for low-light or full-light environments. The reflective particles 48 can be metal flakes or may include a phosphorescent material so that the reflective particles are a "glow-in-the-dark" material. In embodiments with reflective particles 48, a curved portion 60 of the inflated bladder element 10, discussed with respect to FIG. 9, facilitates reflecting of the light by the reflective particles 48. For example, during a normal gait, a foot on which the article of footwear 18 is worn is repeatedly lifted and planted. The motion of the normal gait creates an additional "flash" of reflected light from the reflective particles 48 and makes the article of footwear 18 more noticeable.

Figure 3:
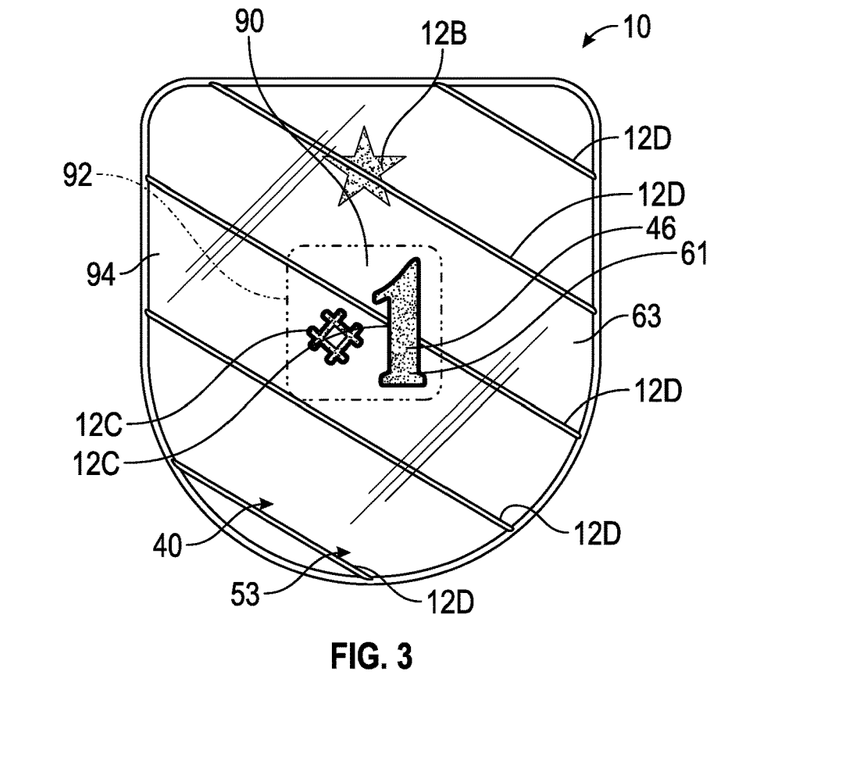
FIG. 3 is a schematic illustration in bottom view of the bladder element of FIG. 1 showing another impression.

Optionally, an etched feature 12A can be etched on the bladder element 10. Etched feature 12A, shown in FIG. 1, is etched on the first polymeric sheet 20, impressions 12C and 12D are imparted on the first polymeric sheet 20, and the impression 12B is imparted on the second polymeric sheet 22, as shown in FIG. 3. In an embodiment in which the colored medium 46 is an ink, applying the colored medium 46 to the bladder element 10 may be by printing the ink on the first polymeric sheet 20 prior to or after imparting the impressions 12C and 12D and etching the etched feature 12A, and printing the ink on the second polymeric sheet 22 prior to or after imparting the impression 12B. Exemplary printing techniques include direct and indirect printing techniques.

The first polymeric sheet 20 and the second polymeric sheet 22 are secured to one another so that the bladder element 10 defines a sealable internal cavity 23. As explained herein, the materials of the first polymeric sheet 20 and the second polymeric sheet 22, as well as the construction of the bladder element 10 are configured so that the bladder element 10 is capable of retaining fluid in the sealable internal cavity 23 when the sealable internal cavity 23 is sealed. For example, the sealable internal cavity 23 may be filled with a gas at or above ambient pressure.

Figure 12:
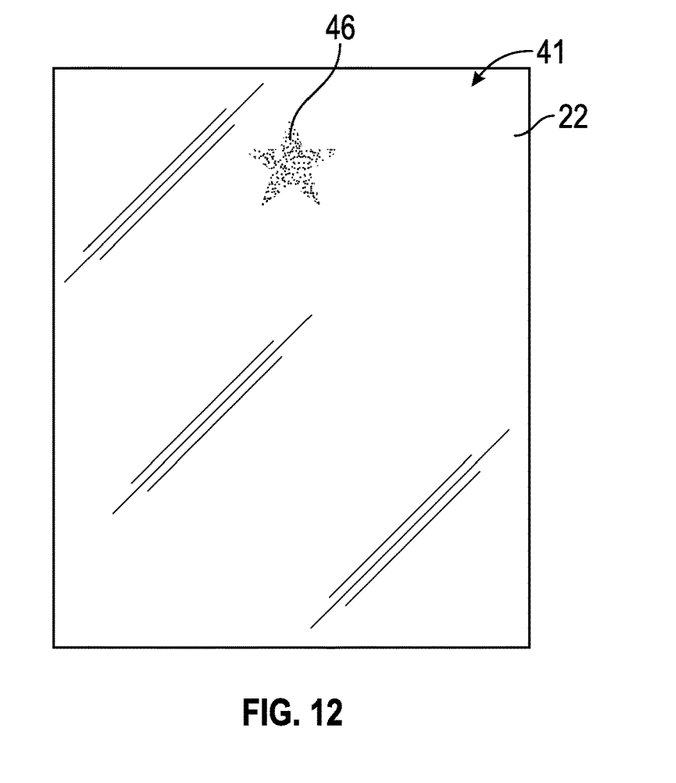
FIG. 12 is a schematic illustration in plan view of a second polymeric sheet used to form the bladder element of FIG. 1, showing an image applied with a colored medium.
Figure 13:
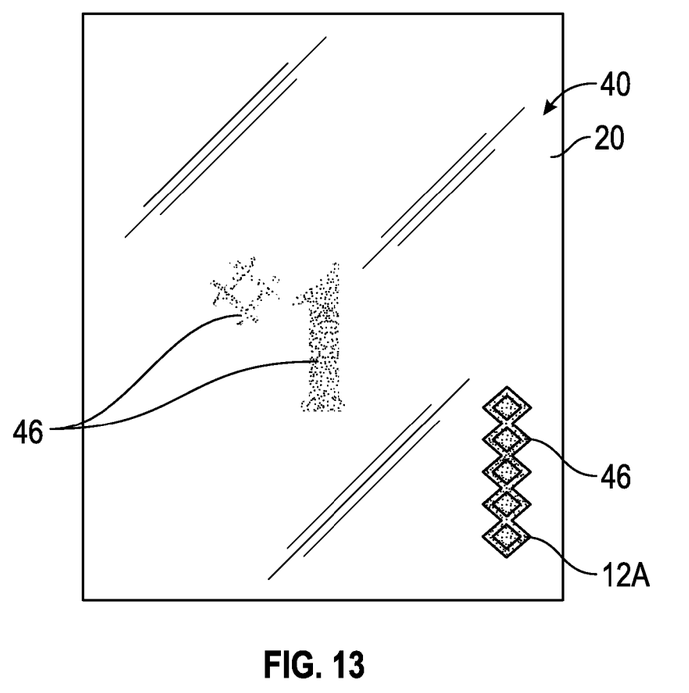
FIG. 13 is a schematic illustration in plan view of a first polymeric sheet used to form the bladder element of FIG. 1, showing images applied with a colored medium, and an etched feature.

The etched feature 12A is aligned with and adjacent to colored medium 46 applied to the first polymeric sheet 20. The impression 12C is also shown aligned with and on the colored medium 46 applied to the first polymeric sheet 20. The impression 12B is aligned with the colored medium applied to the second polymeric sheet 22. As best shown in FIG. 1, a portion of the impression 12B is on the colored medium 46, and a portion of the impression 12B is adjacent to the colored medium 46 applied to the second polymeric sheet 22. FIG. 12 shows an embodiment in which the colored medium 46 is applied on an outer surface 41 of the second polymeric sheet 22 as a star-shaped image in the embodiment shown prior to formation of the bladder element 10. FIG. 13 shows an embodiment in which the colored medium 46 is applied on an outer surface 40 of the first polymeric sheet 20 as an image of the number one and a number sign in the embodiment shown prior to formation of the bladder element 10.

Figure 14:
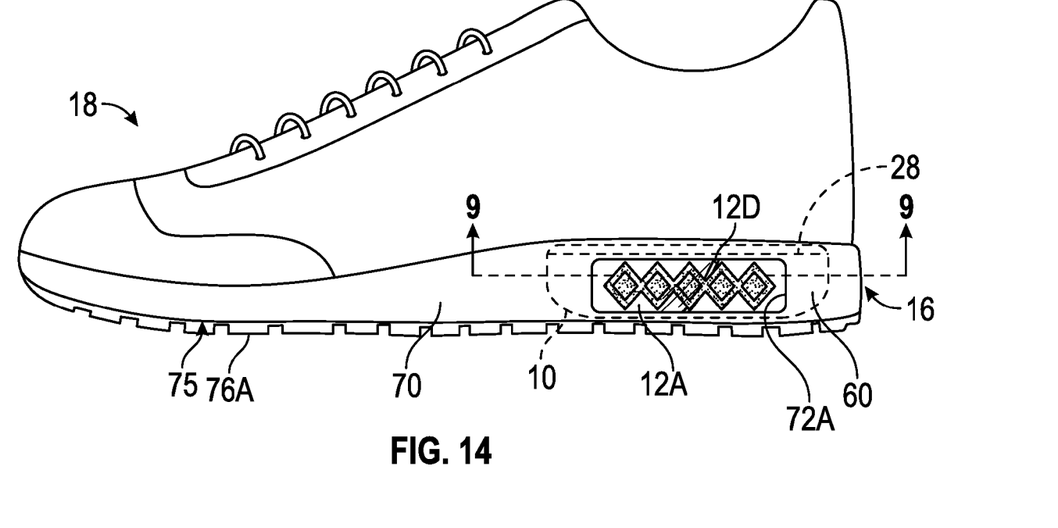
FIG. 14 is a schematic side view illustration of an article of footwear having a sole assembly with the bladder element of FIG. 1 secured to the sole assembly.

The bladder element 10 with etched feature 12A and impressions 12B, 12C, 12D is included in a sole assembly 16 of an article of footwear 18. As shown in FIG. 14, the article of footwear 18 is an athletic shoe, and the bladder element 10 is a cushioning element. In other embodiments, the sole assembly 16 could be for an article of footwear that is a dress shoe, a work shoe, a sandal, a slipper, a boot, or any other category of footwear. Alternatively, the fluid-filled bladder element 10 could be used as a cushioning element in another article, such as but not limited to a shoulder strap, a backpack, a shoulder pad, a glove, an elbow pad, a knee pad, a shin guard, or other apparel, or a sports ball.

Figure 4:
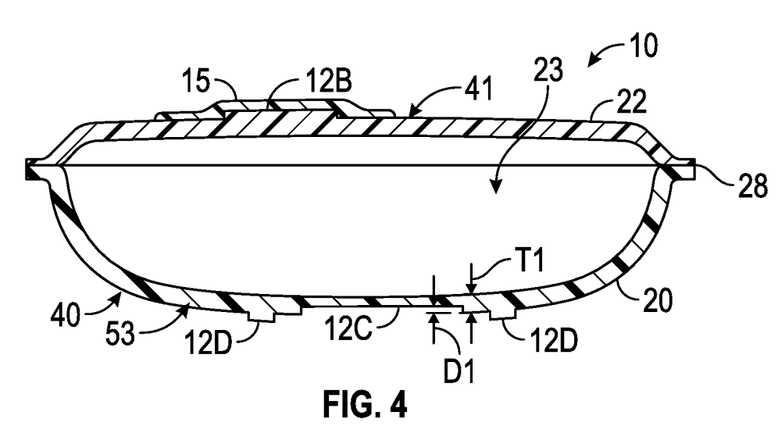
FIG. 4 is a schematic illustration in fragmentary cross-sectional view of the article of bladder element of FIG. 1 taken at lines 4-4 in FIG. 1.

FIG. 4 shows that the impression 12B is a protrusion in the outer surface 41 of the second polymeric sheet 22 in the shape of a star. Impressions 12C and 12D are imparted on the outer surface 40 of the first polymeric sheet 20. When the bladder element 10 is formed, the impression 12C is on a bottom surface 53, which is part of the outer surface 40. In the embodiment shown, the impression 12B is a star shape. In the embodiment shown, the impression 12C includes the number one and the number sign. For example, the impression 12C may be a player number. The impression 12C is a recess in the outer surface 40 of the first polymeric sheet 20. The impression 12D is a series of protrusions in the form of elongated stripes on the outer surface 40. In the embodiment shown in FIG. 1, the etched feature 12A is a diamond pattern.

As shown in FIG. 3, even though the impression 12B is on the second polymeric sheet 22, it can be viewed from an exterior of the bladder element 10 through the first polymeric sheet 20 (i.e., is exposed to view through the first polymeric sheet 20) due to the substantially transparent nature of the first and second polymeric sheets 20, 22. In another embodiment, the bladder element 10 may be formed from a single polymeric sheet or may be formed from substantially transparent polymeric material not in sheet form.

Figures 9, 10, 11:
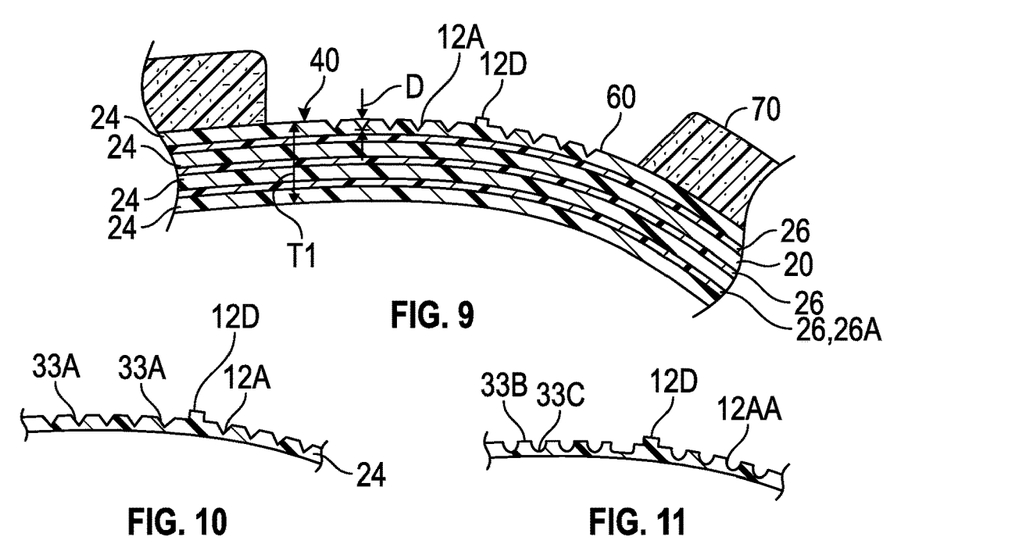
FIG. 9 is a schematic illustration in fragmentary cross-sectional view of the article of footwear of FIG. 14 taken at lines 9-9 in FIG. 14.
FIG. 10 is a schematic illustration in fragmentary cross-sectional view of an outer layer of the polymeric sheet shown in FIG. 9 with the etched feature.
FIG. 11 is a schematic illustration in fragmentary cross-sectional view of an alternative embodiment of an outer layer of the polymeric sheet of FIG. 9 with an alternative impression.

The fluid-filled bladder element 10 can be formed from a variety of polymeric materials. In an embodiment shown and described at least with respect to FIGS. 1-3, the bladder element 10 can be formed from any of various polymeric materials that can retain a fluid at a predetermined pressure, including a fluid that is a gas, such as air, nitrogen, or another gas. For example, the bladder element 10 can be thermoplastic polymeric material. The bladder element 10 can be a urethane, polyurethane, polyester, polyester polyurethane, and/or polyether polyurethane. Moreover, the bladder element 10 can be formed of layers of different materials. FIG. 9, which is a close-up fragmentary cross-sectional portion of the bladder element 10 in an article of footwear 18 taken at lines 9-9 in FIG. 14, shows that the first polymeric sheet 20 is a laminate membrane formed from thin films having one or more first layers 24 that comprise thermoplastic polyurethane layers 24 and that alternate with one or more second layers 26, also referred to herein as barrier layers, gas barrier polymers, or gas barrier layers, that comprise a copolymer of ethylene and vinyl alcohol (EVOH) that is impermeable to the pressurized fluid contained therein as disclosed in U.S. Pat. No. 6,082,025 to Bonk et al., which is incorporated by reference in its entirety. The second polymeric sheet 22 may be formed from the same materials shown and described in FIG. 9 with respect to the first polymeric sheet 20. The first layer 24 may be arranged to form an outer surface of the first polymeric sheet 20. That is, the outermost first layer 24 shown in FIG. 9 may be a portion of the outer surface 40 of the bladder element 10. The bladder element 10 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The bladder element 10 may also be a flexible microlayer membrane that includes alternating layers of a gas barrier polymer material such as second layers 26 and an elastomeric material such as first layers 24, as disclosed in U.S. Pat. Nos. 6,082,025 and 6,127,026 to Bonk et al. which are incorporated by reference in their entireties. Additional suitable materials for the bladder element 10 are disclosed in U.S. Pat. Nos. 4,183,156 and 4,219,945 to Rudy which are incorporated by reference in their entireties. Further suitable materials for the bladder element 10 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladder element 10, engineering properties such as tensile strength, stretch properties, fatigue characteristics, dynamic modulus, and loss tangent can be considered. The thicknesses of the first and second polymeric sheets 20, 22 of materials used to form the bladder element 10 can be selected to provide these characteristics. For example, in various embodiments, the bladder element 10 may have a Shore A hardness of about 20 to about 100 when inflated.

As further explained herein, the first and second polymeric sheets 20, 22 used to form the bladder element 10 may be treated or processed, and/or have properties specifically selected to enable the etched feature 12A and the impressions 12B, 12C and 12D to be lasting and aesthetically pleasing while protecting the ability of the bladder element 10 to sealingly retain the fluid.

In various embodiments, the etched feature 12A may comprise at least one of a protrusion from or a recess in the surface of the bladder element 10. For example, FIG. 10 shows a series of recesses 33A arranged to form the diamond pattern of the etched feature 12A. The recesses 33A are generally triangular grooves in cross section, as shown in FIG. 10, and may be made by removing some of the material of the outermost layer 24 of first polymeric sheet 20 during the etching process. FIG. 10 also shows the protruding impression 12D on the etched feature 12A. FIG. 11 shows an alternative etching pattern to create an alternative etched feature 12AA that can be used in place of etched feature 12A. The etched feature 12AA forms the diamond pattern by a series of protrusions 33B that are arranged by displacing some of the material of the outermost layer 26 from recesses 33C to protrusions 33B during the etching process. FIG. 11 shows the protruding impression 12D on the etched feature 12AA.

As shown in FIG. 9, the first polymeric sheet 20 has a first thickness T1. In an embodiment in which the first polymeric sheet 20 comprises a gas barrier polymer, such as in an embodiment in which the second layers 26 are a gas barrier polymer, a maximum depth of the etched feature 12A in the first polymeric sheet 20 is controlled so that the gas barrier polymer of layers 26 is not compromised. A maximum depth D into the first polymeric sheet 20 of the etched feature 12A is much less than a thickness T1 of the first polymeric sheet 20 and is less than the thickness of the outermost one of the first layers 24. The maximum depth D could range up to about one-half of the thickness T1 of the first polymeric sheet 20, as the innermost layer 26A of the gas barrier layers 26 would still be intact, enabling a desired maximum gas transmission rate. For example, the bladder element 10 may have a gas transmission rate for nitrogen of less than 10 cubic centimeters per square meter per atmosphere per day, or of less than 1 cubic centimeter per square meter per atmosphere per day. In various embodiments, by way of non-limiting example, the depth of the etched feature 12A may be from 73 micrometers to 270 micrometers.

In certain embodiments, a protective coating layer 15, also referred to as a topcoat or barrier and shown in FIGS. 1 and 4 with respect to impression 12B, can be placed on and secured to the bladder element 10 over one or more of the impressions 12B, 12C, 12D or etched feature 12A to protect the impressions 12B, 12C, 12D or etched feature 12A. Exemplary materials for a coating layer include polymers or prepolymers such as polyurethane, polytetrafluoroethylene, polypropylene, polycarbonate, and the like, as non-limiting examples.

Figure 5:
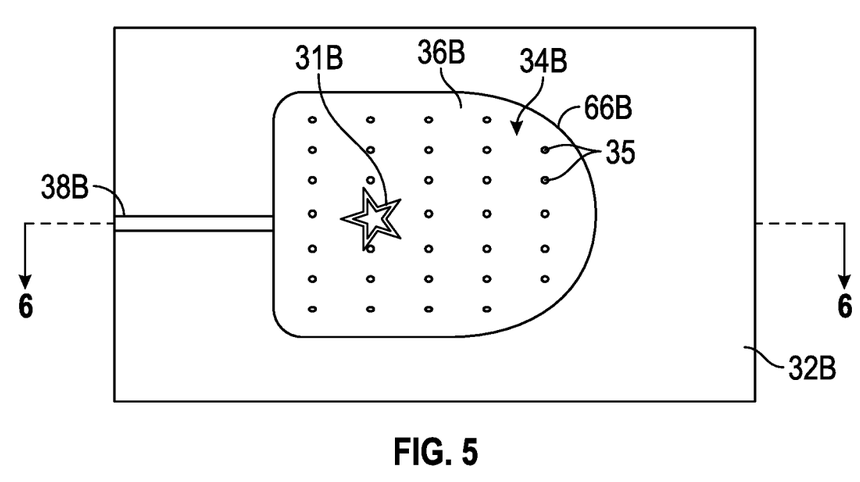
FIG. 5 is a schematic illustration in plan view of a mold half of a mold assembly for forming the bladder element of FIG. 1.
Figure 6:
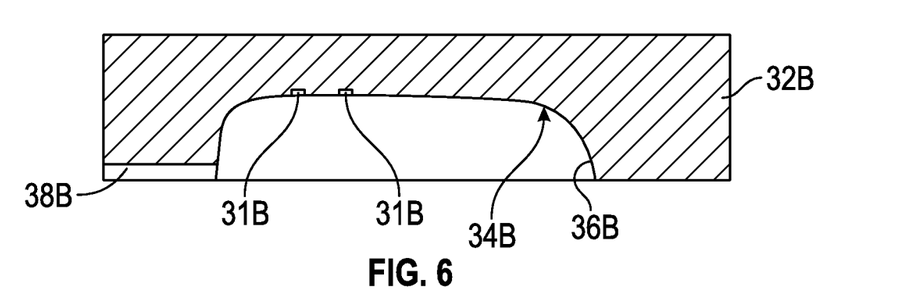
FIG. 6 is a schematic illustration in cross-sectional view of the mold half of FIG. 5 taken at lines 6-6 in FIG. 5.
Figure 7:
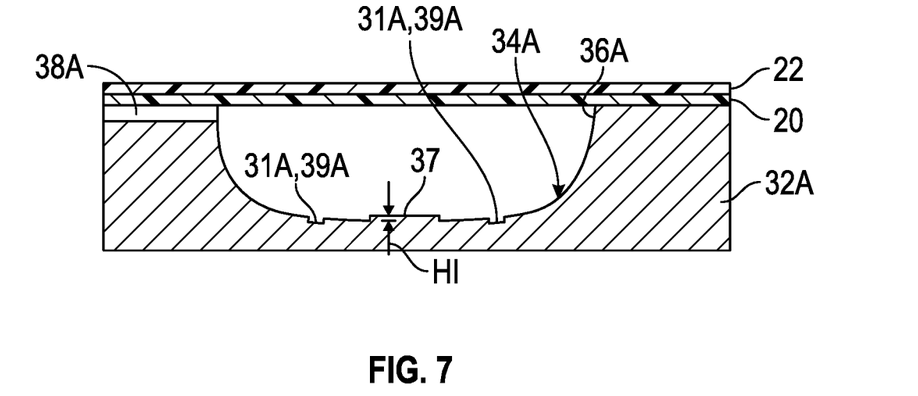
FIG. 7 is a schematic illustration in cross-sectional view of another mold half of the mold assembly taken at lines 7-7 in FIG. 8.
Figure 8:
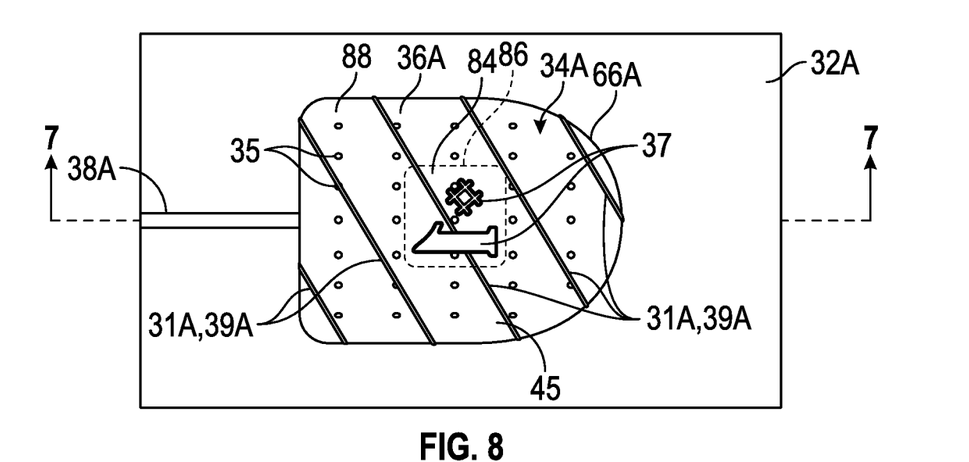
FIG. 8 is a schematic illustration in plan view of the mold half of FIG. 7.

The bladder element 10 may be manufactured using a mold assembly 32A, 32B that includes a first mold half 32A of FIGS. 7 and 8, and a second mold half 32B of FIGS. 5 and 6. The first mold half 32A has a cavity portion 36A with a mold surface 34A. Referring to FIGS. 7 and 8, the mold surface 34A has an etched area 37, which in the embodiment shown is a protrusion in the shape of a reverse (i.e., mirror image) of the number one and the number sign that are imparted as the impression 12C. When the first polymeric sheet 20 is conformed to the mold surface 34A during forming of the bladder element 10 as discussed herein, the impression 12C of the etched area 37 is imparted on the outer surface 40 of the bladder element 10. The material of the first polymeric sheet 20 is displaced by the protruding etched area 37 so that the impression 12C is a recess in the first polymeric sheet 20.

Referring to FIG. 4, a maximum depth D1 of the impression 12C in the first polymeric sheet 20 is controlled so that the gas barrier polymer of layers 26 shown in FIG. 9 are not compromised. For example, referring to FIG. 7, the etching of the mold surface 34A is controlled to provide a maximum height H1 of the protrusion of the etched area 37, with the maximum height H1 equaling the maximum depth D1. In one embodiment, if chemical etching is used, a depth of etching in the mold surface 34A may be controlled at increments of 0.008 to 0.015 inches. Referring to FIG. 4, the maximum depth D1 into the first polymeric sheet 20 of the impression 12C is much less than a thickness T1 of the first polymeric sheet 20. The maximum depth D1 could range up to about one-half of the thickness T1 of the first polymeric sheet 20, as the innermost layer 26A of the gas barrier layers 26 (shown in FIG. 9) would still be intact, enabling a desired maximum gas transmission rate.

The mold surface 34A also has an etched area 31A, which in the embodiment shown is a series of diagonal, etched grooves 39A. The etched grooves 39A are recessed in the mold surface 34A. When the first polymeric sheet 20 is conformed to the mold surface 34A during forming of the bladder element 10, the impression 12D of the etched area 31A is imparted onto the outer surface 40 of the bladder element 10. The material of the first polymeric sheet 20 fills the etched grooves 39A of the mold half 32A during forming of the bladder element 10, creating the impression 12D. The impression 12D this is a protrusion from the first polymeric sheet 20. The etched feature 12A on the first polymeric sheet 20 at least partially aligns with the impression 12D, as shown in FIGS. 1 and 14.

Figure 15:
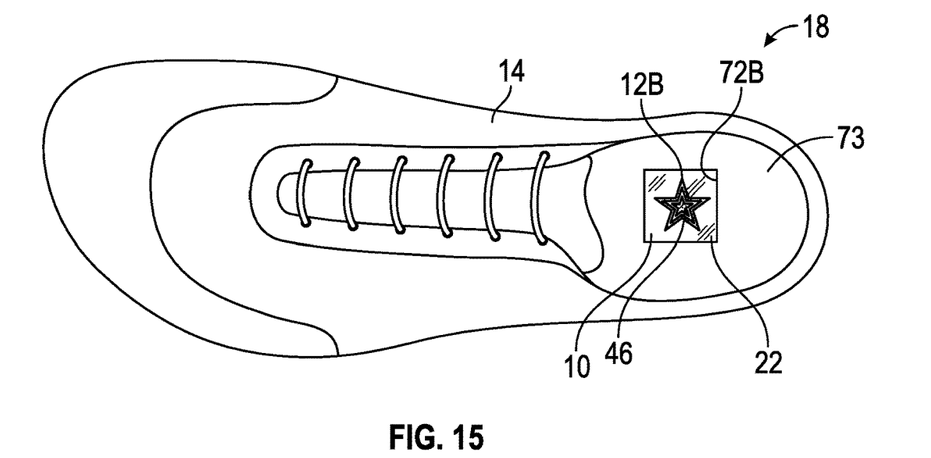
FIG. 15 is a schematic top view illustration of the article of footwear of FIG. 14.

The mold surface 34B also has an etched area 31B, which in the embodiment shown is an outline of a star shape. The etched area 31B is recessed in the mold surface 34B. When the second polymeric sheet 22 is conformed to the mold surface 34B during forming of the bladder element 10, the impression 12B of the etched area 31B is imparted onto the outer surface 41 of the bladder element 10. The material of the second polymeric sheet 22 fills the etched area 31B of the mold half 32B during forming of the bladder element 10, creating the impression 12B. The colored medium 46 on the second polymeric sheet 22 at least partially aligns with the impression 12B, as shown in FIGS. 1 and 15.

Although the etched feature 12A is shown on the outer surface 40, the etched feature 12A may instead be on an inner surface of the bladder element 10 by etching the etched feature 12A on an opposite side of the first polymeric sheet 20. FIG. 14 also illustrates that the etched feature 12A and/or the impression 12D can be configured in one embodiment to be adjacent to or on the colored medium 46 on the first polymeric sheet 20.

The bladder element 10 may be manufactured by first disposing the first polymeric sheet 20 in a mold assembly 32A, 32B that includes a first mold half 32A of FIGS. 7 and 8, and a second mold half 32B of FIGS. 5 and 6. The second polymeric sheet 22 is placed on the first polymeric sheet 20. The polymeric sheets 20, 22 are shown for purposes of illustration on the first mold half 32A, although not shown in the plan view of FIG. 8 for purposes of clarity. The polymeric sheets 20, 22 lay over the mold cavity 36A of FIG. 8 when placed on the first mold half 32A as shown in FIG. 7. The mold assembly 32A, 32B is then closed by placing the mold halves 32A, 32B together, with the second mold half 32B on first mold half 32A and the first and second polymeric sheets 20, 22 between the mold halves 32A, 32B.

The first polymeric sheet 20 is then conformed to the mold surface 34A and the second polymeric sheet 22 is conformed to the mold surface 34B to at least partially form the bladder element 10 with the sealable internal cavity 23. Conforming the first and second polymeric sheets 20, 22 to the mold surfaces 34A, 34B may be, for example, by vacuum forming with a vacuum applied through the openings, also referred to as vacuum ports 35 (only some of which are indicated with the reference number) and/or by thermoforming. The first and second polymeric sheets 20, 22 conform to the etched area 37, 31A, respectively, imparting impression 12B onto the outer surface 41 of the second polymeric sheet 22, and the impressions 12C and 12D of the etched areas 37, 31A onto the outer surface 40 of the first polymeric sheet 20. The etched feature 12A and impressions 12C, 12D are on the outer surface 40 of the bladder element 10.

The etched feature 12A may be etched on the outer surface 40 of the first polymeric sheet 20 by at least one of laser etching or mechanical etching. Laser etching can be carried out with a laser etching machine that uses a computer controlled laser. The laser moves according to a predetermined pattern and at predetermined depths pursuant to a stored software algorithm to create the etched feature 12A. Mechanical etching can be accomplished using a tool head that contacts the surface 40 of the first polymeric sheet 20 to etch the etched feature 12A. A mechanical etching machine can be used so that the tool head is also computer controlled to move according to a predetermined pattern and at predetermined depths pursuant to a stored software algorithm to create the etched feature 12A.

With reference to FIG. 1, the first polymeric sheet 20 is bonded to the second polymeric sheet 22 to form a peripheral seam 28 around a periphery of the bladder element 10. The peripheral seam 28 partially seals the internal cavity 23 of the bladder element 10, and the internal cavity 23 is completely sealed once a fill tube or other filling mechanism formed with the bladder element 10 is plugged. The fill tube is formed at mating recesses 38A, 38B of the mold assembly 32A, 32B as described with respect to FIGS. 5-8, and is subsequently trimmed from the bladder element 10 after being used to inflate the internal cavity 23 and after being plugged. The peripheral seam 28 may also help the bladder element 10 retain its shape. The first and second polymeric sheets 20, 22 can be bonded to one another with or without the use of an adhesive and by thermal bonding during thermoforming, compression forming, radio frequency (RF) welding in the mold assembly 32A, 32B as shown in FIGS. 6 and 7.

Referring to FIG. 8, to form the bladder element 10 in the mold assembly 32A, 32B, either before or after the etched feature 12A is etched on the first polymeric sheet 20, the first polymeric sheet 20 is laid on the first mold half 32A, across the mold cavity portion 36A so that the colored medium 46 shown in FIG. 13 is aligned with the etched area 37. The second polymeric sheet 22 is then placed on the first polymeric sheet 20 so that the colored medium 46 shown in FIG. 12 is aligned with the impression 12B. Alternatively, colored medium 46 could be applied after the bladder element 10 is formed. Both the first and the second polymeric sheets 20, 22 are in their original, generally flat form when initially placed on the first mold half 32A. After the first and second polymeric sheets 20, 22 are placed on the first mold half 32A, the mold assembly 32A, 32B is closed. Alternatively, if polymeric material not in the form of sheets is used, the material could be placed in the mold cavity portion 36A prior to closing the mold assembly 32A, 32B.

A forming process is then used to shape the first and second polymeric sheets 20, 22 to the mold halves 32A, 32B, such as by the use of temperature and pressure control. For example, the forming process may include any or all of thermoforming, vacuum forming, compression forming, or radio frequency (RF) welding. Vacuum ports 35 are shown extending through the mold halves 32A, 32B, and a vacuum may be applied through the ports 35 to pull the first and second polymeric sheets 20, 22 against the mold surfaces 34A, 34B in the mold halves 32A, 32B. Only some of the many like vacuum ports 35 are numbered in FIGS. 5 and 8. The first and second polymeric sheets 20, 22 may be heated by the mold assembly 32A, 32B during the forming process. Additionally, a fill tube may be formed by the first and second polymeric sheets 20, 22 at the recesses 38A, 38B in the mold halves 32A, 32B. The recesses 38A, 38B mate when the mold assembly 32A, 32B is closed. The portion of the first and second polymeric sheets 20, 22 surrounding the mold cavity portions 36A, 36B are bonded to one another by any or all of thermal bonding during thermoforming, radio frequency welding, or compression forming through pressure applied by the mold halves 32A, 32B or by a separate machine after removal from the mold halves 32A, 32B.

After the first and second polymeric sheets 20, 22 are formed to the contours of the mold assembly 32A, 32B in the mold cavity portions 36A, 36B and, if heated, sufficiently cooled, the mold halves 32A, 32B are then separated, and excess material of the first and second polymeric sheets 20, 22 around the periphery of the seam 28 is trimmed. The fill tube formed at the recesses 38A, 38B may be used to inflate the bladder element 10 with gas at or above ambient pressure, and then the fill tube may be plugged and trimmed so that the bladder element 10 is in its final, formed state.

As best shown in FIGS. 1, 9 and 14, at least the etched feature 12A and a portion of the impression 12D are on a curved portion 60 of the outer surface 40 of the bladder element 10. The etched feature 12A and the impressions 12B, 12C and 12D are each spaced apart from the peripheral seam 28 on the formed bladder element 10 due to the initial placement of the etched areas 37, 31A, 31B in the mold assembly 32A, 32B away from a perimeter 66A, 66B of the mold cavity portions 36A, 36B. The etched feature 12A is etched on the first polymeric sheet 20 so that it is also spaced apart from the peripheral seam 28.

The surface 40 of the bladder element 10 may have at least one of a predetermined level of opacity, transparency or luster achieved by treating the surface 40 of the bladder element 10 by at least one of heating or applying a softening agent. For example, with reference to FIG. 3, a first area 61 of the outer surface 40 of the bladder element 10 is the area both including the number one of the impression 12C and within the number one. The impression 12C is on the first area 61. The first area 61 has a first predetermined level of opacity, transparency or luster. A second area 63 of the surface 40 of the bladder element 10 is the area surrounding and not within the impression 12C, and has a second predetermined level of opacity, transparency or luster that is different than the first predetermined level, such as at least ten percent greater than or at least ten percent less than the first predetermined level of opacity, transparency or luster.

The second area 63 may achieve a predetermined level of opacity, transparency, or luster by heating the entire bladder element 10, such as after formation and/or while in the mold assembly 32A, 32B. The first area 61 may be made more lustrous than the second area 63 such as by applying a softening agent only to the first area 61.

The surface roughness of the mold surfaces 34A, 34B can also affect the opacity, transparency, and luster of the bladder element 10. Alternatively, or in addition to treating the bladder element 10, a region of either or both of the mold surfaces 34A, 34B can be polished to a predetermined surface roughness to help achieve the predetermined level of opacity, transparency or luster of the bladder element 10. For example, with reference to FIG. 8, a first region 84 of the mold surface 34A can be polished to a first average surface roughness. The first region 84 has a perimeter 86 shown in phantom. A second region 88 of the mold surface 34A is the region outside of the perimeter 86, surrounding the first region 84. The second region 88 has a second average surface roughness that can be obtained by polishing, or can be obtained simply by the casting or machining of the mold half 32A. Polishing can be by sandblasting, such as at 0.001 inch increments. The etched area 37 is shown with the first region 84. The etched area 31A is partially in the first region 84 and partially in the second region 88. The polishing of the first region 84 results in a first average surface roughness of the mold surface 34A in the first region 84 which is at least ten percent greater than or at least ten percent less than the second average surface roughness in the second region 88, as may be accomplished by the material selected and used to polish the surface 34A. The surface 40 of the bladder element 10 has a first area 90 with a perimeter 92 as shown in FIG. 3. The first area 90 corresponds with the first region 84 of the mold surface 34A. The surface 40 of the bladder element 10 also has a second area 94 that corresponds with the second region 88 of the mold surface 34A. The first area 90 and the second area 94 may differ in opacity, transparency, or luster as a result of the difference in polishing between the regions 84, 88. For example, the level of transparency and the level of haze may be measured as described herein, such as by using the American Society for Testing and Materials (ASTM) Standard D1003-00, Standard Test Method for Haze and Luminous Transmittance of Transparent Plastics.

With reference to FIG. 14, the bladder element 10 can be secured in the sole assembly 16 such as by bonding to a midsole 70 of the sole assembly 16. For example, the bladder element 10 can be bonded with adhesive to the formed midsole 70. Alternatively, the bladder element 10 can be placed in a midsole mold assembly (not shown), and the midsole 70 may be formed around the bladder element 10, such as by injecting foam into the midsole mold assembly. In still other embodiments, the bladder element 10 is secured to the sole assembly 16 by an interference fit. In some embodiments, the bladder element 10 serves as at least a portion of a midsole, an outsole, or both. In all such embodiments, because the etched feature 12A and the impressions 12B, 12C, and 12D are spaced apart from the peripheral seam 28, the bladder element 10 can be assembled in the article of footwear 18 so that the etched feature 12A and the impressions 12B, 12C, and 12D are aligned with and exposed to view through the openings in the sole assembly 16 and/or in a footwear upper extending over the sole assembly 16, such as represented by an insole or sockliner 73 as described herein, while the seam 28 can be covered by and block from view by the article of footwear 18. For example, as shown in FIG. 14, the midsole 70 is formed with an opening 72A. The etched feature 12A is positioned at the opening 72A so that it is exposed at the exterior of the article of footwear 18, while the seam 28 is covered by the midsole 70 and is not exposed at the opening 72A. Stated differently, a first portion of the bladder element 10 including the etched feature 12A is aligned with the opening 72A and exposed to view through the opening 72A (i.e., such as from a viewpoint of a side view as in FIG. 14). A second portion of the bladder element (i.e., the portion indicated with hidden lines in FIG. 14) is covered by and blocked from view by the midsole 70.

In another example, as shown in FIG. 15, the sockliner 73 also has an opening 72B and the bladder element 10 is secured to the sole assembly 16 so that the sole assembly 16 and the sockliner 73 do not cover the impression 12B, and a first portion of the bladder element 10 with the impression 12B is exposed to view through the opening 72B, with the impression 12B aligned with the opening 72B. A second portion of the bladder element 10, including the peripheral seam 28, is not exposed at the opening 72B, but is covered by and blocked from view at least by the sockliner 73 (i.e., from the viewpoint of FIG. 15).

Figure 16:
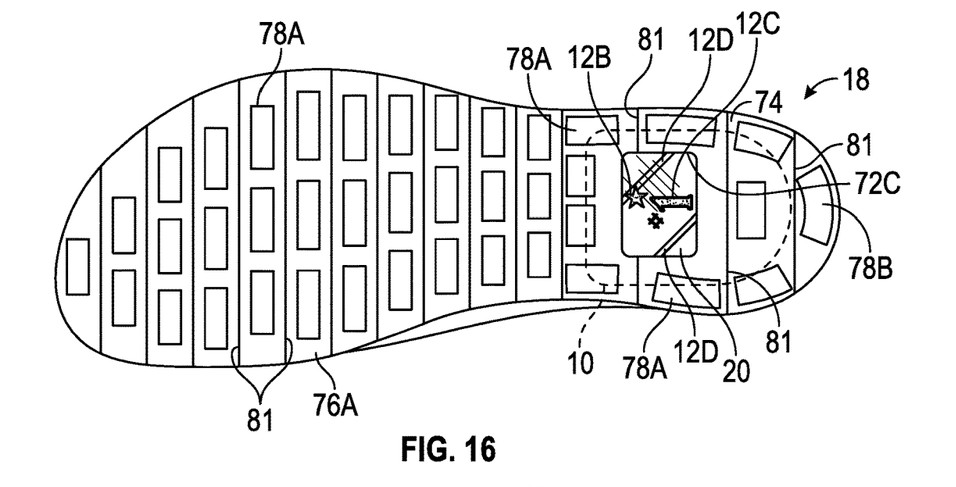
FIG. 16 is a schematic bottom view illustration of the article of footwear of FIG. 14 having a first embodiment of an outsole.

As is apparent in FIG. 16, the sole assembly 16 does not cover at least the impression 12C. The sole assembly 16 includes an outsole 76A secured to a lower surface 75 of the midsole 70 as also shown in FIG. 14. In one embodiment, the outsole 76A has an opening 72C that is aligned with the impression 12C so that the impression 12C is exposed at the exterior of the article of footwear 18 and may be viewed from a viewpoint looking at a bottom of the footwear 18, such as when a wearer of the article of footwear 18 lifts a heel portion 74 of the article of footwear 18. A second portion of the bladder element 10, represented by hidden lines in FIG. 16, is covered by the outsole 76A and blocked from view by the outsole 76A.

The outsole 76A is shown with tread elements 78A having bottom surfaces that form a ground contact surface of the article of footwear 18. The tread elements 78A can have various alternative shapes and can be arranged in various alternative arrangements. The outsole 76A shows grooves 81 formed in the outsole 76A.

Figure 17:
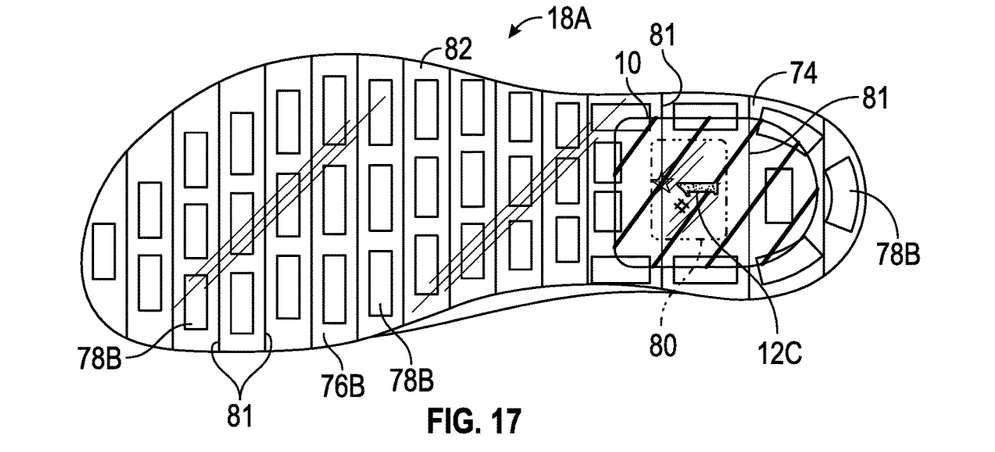
FIG. 17 is a schematic bottom view illustration of the article of footwear of FIG. 14 having an alternative embodiment of an outsole.

FIG. 17 shows an alternative embodiment of an outsole 76B secured to the midsole 70 of FIG. 14 and to the bladder element 10. The outsole 76B has at least a portion 80, bounded by phantom lines, that is substantially transparent. The substantially transparent portion 80 is aligned with the impression 12C so that the impression 12C is exposed to view at an exterior of an article of footwear 18A, and may be viewed, such as when a wearer lifts the heel portion 74 of the article of footwear 18A. A remaining portion 82 of the outsole 76B, not bounded by the phantom lines, can also be substantially transparent. In the embodiment shown, the entire outsole 76B is substantially transparent. Alternatively, the remaining portion 82 could be opaque or not substantially transparent. The outsole 76B shows grooves 81 formed in the outsole 76B and a different arrangement of tread elements 78B. The article of footwear 18A has a different outsole 76B than the article of footwear 18, but is otherwise the same as the article of footwear 18.

Figure 18:
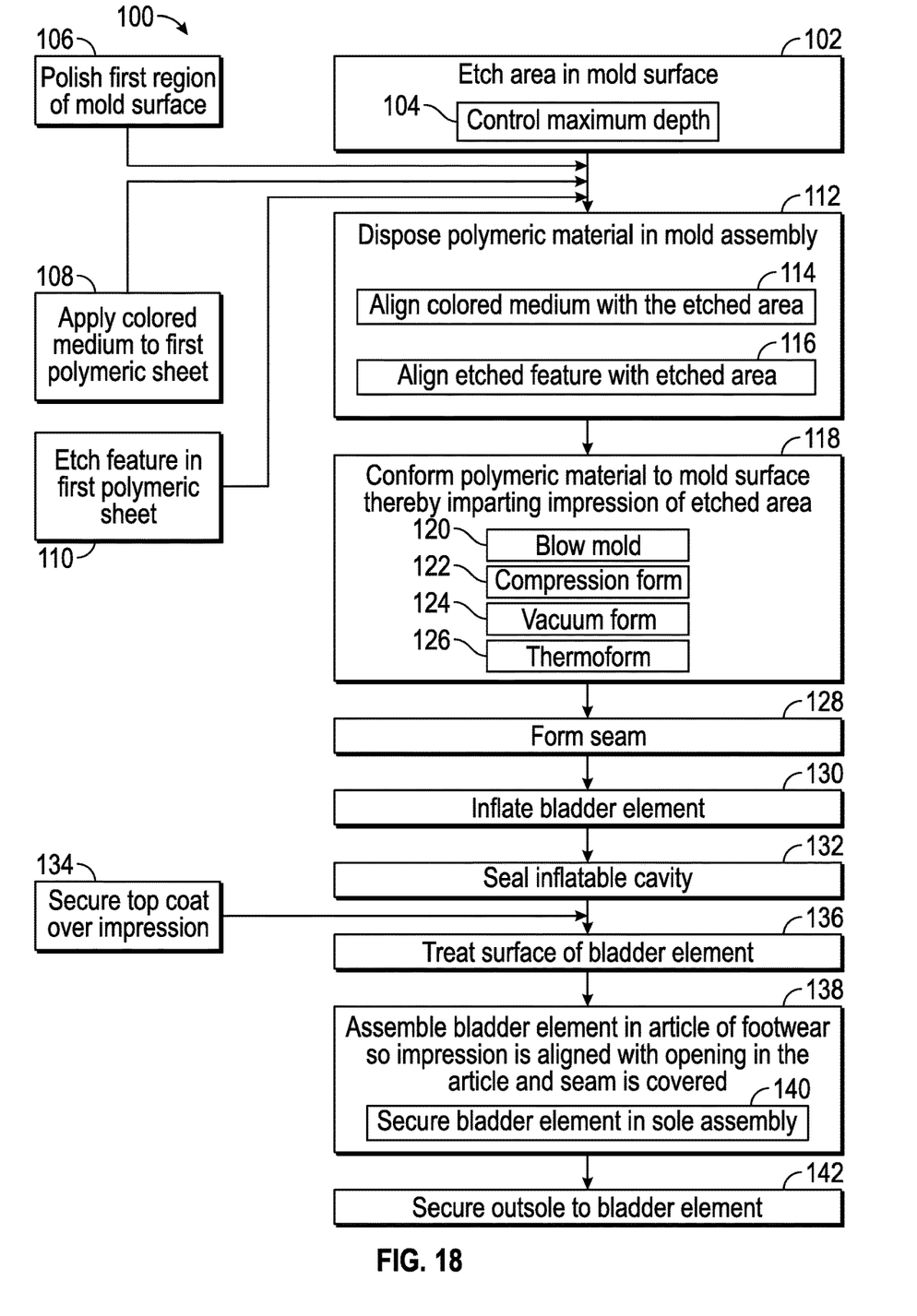
FIG. 18 is a flow diagram illustrating a method of manufacturing an article such as the article of footwear of FIG. 14.

Referring to FIG. 18, a method 100 of manufacturing an article, such as the article of footwear 18, is described with respect to the bladder element 10 of FIGS. 1-4, the mold assembly 32A, 32B of FIGS. 5-8, and the article of footwear 18 of FIG. 14. The method 100 may begin with step 102, etching any or all of the etched areas 37, 31A in the mold surface 34A by at least one of laser etching, mechanical etching, or chemical etching. Step 102 may also include etching the etched area 31B in the mold surface 36B. Etching of the etched area 37, 31A, and/or 31B in step 102 may be controlled in various ways to enable fluid retention in the internal cavity 23 of bladder element 10. For example, step 102 may include sub-step 104, controlling the etching of the etched area 37 so that the impression 12C has a maximum depth D1 into the first polymeric sheet 20 of not more than about one-half of a first thickness T1 of the first polymeric sheet 20, as discussed with respect to FIG. 4. In some embodiments, the first polymeric sheet 20 comprises a gas barrier polymer. Etching the etched area 37 may be controlled in sub-step 104 so that the gas barrier polymer is not compromised by the impression 12C.

The method 100 may further comprise step 106, polishing the first region 84 of the mold surface 34A to a first average surface roughness, wherein the second region 88 of the mold surface 34A has a second average surface roughness. The etched area 37 and/or the etched area 31A is at least partially in at least one of the first region 84 or the second region 88, as shown in FIG. 8. The first average surface roughness may be at least ten percent greater than or at least ten percent less than the second average surface roughness. The surface 40 of the bladder element 10 includes the first area 90 corresponding with the first region 84 of the mold surface 34A and the second area 94 corresponding with the second region 88 of the mold surface 34A, as discussed with respect to FIG. 3. Step 106 may occur prior to or after step 102. The mold surface 34B may also be polished in a similar manner.

In some embodiments, the method 100 may include step 108, applying a colored medium 46 to the first polymeric sheet 20, such as to create the shape of the number one and the number sign, as shown in FIG. 13, that will be aligned with the etched feature 12C. The colored medium 46 may also be applied to the first polymeric sheet 20 to create a diamond pattern as shown in FIG. 13, and the etched feature 12A may be etched to be adjacent to or on the colored medium 46 on the first polymeric sheet 20. The colored medium 46 may also be applied to the second polymeric sheet 22 to create a star pattern that will be aligned with the impression 12B. It is to be understood that the colored medium 46 could be of different colors or materials at the different areas of application on the first and second polymeric sheets 20, 22.

In some embodiments, the method 100 may include step 110, etching the etched feature 12A on the surface 40 of the first polymeric sheet 20 by at least one of laser etching or mechanical etching. The etched feature 12A may be etched to be adjacent to or on the colored medium 46 on the first polymeric sheet 20. Step 102, including sub-step 104, step 106, step 108, and step 110 can be performed in any order. In some embodiments of the method 100, the first and second polymeric sheets 20, 22 may be obtained with the colored medium 46 already applied thereon, or with the etched feature 12A already etched thereon, in which case steps 108 and 110 are not performed. In still other embodiments, steps 108 and/or 110 may be performed after the bladder element 10 is formed, i.e., after step 132.

The method 100 further comprises step 112, disposing a first polymeric sheet 20 in a mold assembly 32A, 32B. The first polymeric sheet 20 may be disposed in the mold assembly 32A, 32B so that the surface 40 of the first polymeric sheet 20 with the etched feature 12A will be on one of an inner surface or an outer surface of the bladder element 10. In the embodiment shown, the surface 40 is an outer surface of the bladder element 10. In an embodiment in which a colored medium 46 is applied to the first polymeric sheet in step 108, disposing the first polymeric sheet 20 in step 112 may include sub-step 114, aligning the colored medium 46 with the etched area 31A so that the impression 12C will be on or adjacent to the colored medium 46. Similarly, the colored medium 46 on the second polymeric sheet 22 can be aligned with the etched area 31B so that the impression 12B will be on or adjacent to the colored medium 46.

In an embodiment in which the mold assembly 32A, 32B includes a mold surface 34A with an etched area 31A, the method 100 also includes step 116, aligning the etched feature 12A with the etched area 31A so that the impression 12D of the etched area 31A will be adjacent to or on the etched feature 12A, as shown in FIGS. 1, 2 and 14.

After disposing the polymeric material in the mold assembly 32A, 32B, the method 100 further comprises step 118, conforming the polymeric material to the mold surfaces 34A and 34B to form a bladder element 10 with a sealable internal cavity 23. Conforming the polymeric material, such as the first polymeric sheet 20, to the mold surface 34A imparts the impression 12C of the etched area 37 and the impression 12D of the etched area 31A onto the surface 40 of the bladder element 10. Conforming the polymeric material, such as the second polymeric sheet 22, to the mold surface 34B imparts the impression 12B of the etched area 31B onto the surface 41 of the second polymeric sheet 22. Conforming the polymeric material, such as the first and second polymeric sheets 20, 22 to the mold surface 34A and the mold surface 34B may be by any or all of blow molding in sub-step 120, compression forming in sub-step 122, vacuum forming in sub-step 124, or thermoforming in sub-step 126. In other words some or all of the sub-steps 120, 122, 124, and 126 may be performed. For example, if the polymeric material is in other than sheet form, blow molding may be used.

The method 100 may further comprise step 128, forming a peripheral seam 28 in the bladder element 10 that at least partially seals the internal cavity 23. Forming the peripheral seam 28 in step 128 may be by compression forming the first polymeric sheet 20 to the second polymeric sheet 22, such as during step 122 while the sheet 20 is conformed to the mold surface 34A, by radio frequency (RF) welding, and/or by the use of adhesives. Forming the bladder element 10 in step 128 is accomplished so that the first and second polymeric sheets 20, 22 are bonded at the peripheral seam 28, at least a portion of the etched feature 12A and the impressions 12B, 12C and 12D are spaced apart from the peripheral seam 28. Additionally, disposing the first polymeric sheet 20 in the mold assembly 32A, 32B may be so that the etched feature 12A and a portion of the impression 12D is at least partially on a curved portion 60 of the bladder element 10 corresponding to a curved portion 45 of the mold surface 34A indicated in FIG. 8. In other words, in step 108, the first polymeric sheet 20 is disposed on the first mold surface 34A, so that the etched feature 12A and a portion of the impression 12D will be on the curved portion 60 of the bladder element 10 when the bladder element 10 is formed.

The method 100 may further comprise step 130, inflating the bladder element 10 by filling the sealable internal cavity 23 with a fluid, and then sealing the sealable internal cavity 23 in step 132 so that the fluid is retained in the sealable internal cavity 23. In one embodiment, the fluid is a gas at or above ambient pressure. The bladder element 10 may have a gas transmission rate for nitrogen of less than 10 cubic centimeters per square meter per atmosphere per day, or of less than 1 cubic centimeter per square meter per atmosphere per day.

In one embodiment, a substantially transparent topcoat 15 may be secured over the impression 12B in step 134, such as to protect the impression 12B from abrasion. Although described with respect to the impression 12B, the topcoat 15 may be secured over any or all of the impressions 12B, 12C, or 12D and/or over the etched feature 12A.

The method 100 may further comprise step 136, treating the surface 40 and/or 41 of the bladder element 10 to achieve at least one of a predetermined level of opacity, transparency, or luster of the bladder element 10. This treatment may occur after conforming the first polymeric sheet 20 to the mold surface 34A and the second polymeric sheet 22 to the mold surface 34B to at least partially form the bladder element 10. For example, treating the surface 40, 41 of the bladder element 10 may be by at least one of heating the surface 40, 41 of the bladder element 10, such as while the bladder element is in the mold assembly 32A, 32B, or by applying a softening agent to the surface 40, 41 of the bladder element 10. As previously discussed, in some embodiments, the first area 61 of the surface 40 of the bladder element 10 may be treated to achieve a first predetermined level of opacity, transparency, or luster. The second area 63 of the surface 40 of the bladder element 10 may have a second predetermined level of opacity, transparency, or luster that is at least ten percent greater than or at least ten percent less than that of the first predetermined level of opacity, transparency, or luster. The impression 12C is on the first area 61 of the surface 40 of the bladder element 10, and the impression 12D is on both the first area 61 and the second area 63 of the surface 40 of the bladder element 10. The surface 41 of the second polymeric sheet 22 of the bladder element 10 could be treated in a similar manner to achieve at least one of a predetermined level of opacity, transparency, or luster of a first area 90 of the surface 41 that is different than a second predetermined level of opacity, transparency, or luster of a second area 94 of the surface 41, with the impression 12B in one of the first area 90 or the second area 94 of the surface 41.

After any cooling period that may be provided, the mold assembly 32A, 32B is opened, and the bladder element 10 is removed from the mold assembly 32A, 32B. The bladder element 10 with the etched feature 12A and the impressions 12B, 12C, and 12D is now complete. Optionally, if the same entity carrying out steps 102-136 also assembles the bladder element 10 in an article such as the article of footwear 18, then the method 100 can proceed with steps 138, 140 and 142. In step 138, the fluid-filled bladder element 10 is assembled in the sole assembly 16 of the article of footwear 18. Assembling the bladder element 10 in the article of footwear 18 may include sub-step 140, securing the bladder element 10 to the midsole 70. In various embodiments, securing the bladder element 10 to the midsole 70 can be accomplished with adhesive or by forming the midsole 70 around the bladder element 10 in a midsole mold assembly (not shown). In all such embodiments, the bladder element 10 may be assembled in the article of footwear 18 so that the peripheral seam 28 and the second portion of the bladder element 10 are covered by and blocked from view by the article of footwear 18, and the impressions 12B, 12C, and 12D, as well as etched feature 12A, if included, are exposed to view through openings such as opening 72A in the midsole 70 and opening 72B in the sockliner 73, as described with respect to the embodiment of FIGS. 9 and 14. In other words, the etched feature 12A and a portion of the impression 12D are aligned with the opening 72A so that the etched feature 12A and impression 12D are exposed to view and can be viewed through the opening 72A from an exterior of the article of footwear 18. Similarly, the impression 12B is aligned with the opening 72B so that the impression 12B is exposed to view and can be viewed through the opening 72B from an exterior of the article of footwear 18.

Next, in step 142, an outsole can be secured to the midsole 70. If outsole 76A of FIG. 16 is used, the opening 72C is aligned with the impression 12C and with a portion of impression 12D. The impression 12B can also be viewed through the substantially transparent bladder element 10 at the opening 72C. If outsole 76B of FIG. 17 is used, the substantially transparent portion 80 of the outsole 76B is aligned with the impression 12C and with a portion of the impression 12D so that the impressions 12C, 12D are exposed to view through the substantially transparent portion of the outsole 76B. As discussed above, the entire outsole 76B may be substantially transparent.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

The invention claimed is:
1. An article of footwear comprising:
a sole assembly including a midsole, and an outsole;
wherein:
the midsole includes a fluid-filled bladder element including a first polymeric sheet that has a surface with an impression;

the fluid-filled bladder element further including a second polymeric sheet bonded to the first polymeric sheet at a peripheral seam so that the fluid-filled bladder element defines a sealable internal cavity that retains fluid;

the first polymeric sheet comprises a gas barrier polymer and has a first thickness;

the impression comprises a recess in the surface of the fluid-filled bladder element;

the impression has a maximum depth into the first polymeric sheet of not more than about one-half of the first thickness such that the gas barrier polymer is not compromised by the impression;

a first portion of the fluid-filled bladder element with the impression is exposed to view through one of the midsole or the outsole; and a second portion of the fluid-filled bladder element is blocked from view by said one of the midsole or the outsole.

2. The article of footwear of claim 1, further comprising:
a colored medium applied to the first polymeric sheet; and
wherein the impression is adjacent to or on the colored medium on the first polymeric sheet.

3. The article of footwear of claim 1, wherein:
the impression is spaced apart from the peripheral seam; and
the peripheral seam is covered by and blocked from view by said one of the midsole or the outsole.

4. The article of footwear of claim 1, wherein the impression further comprises a protrusion at the surface of the fluid-filled bladder element.

5. The article of footwear of claim 1, wherein:
a first area of the surface of the fluid-filled bladder element has a first predetermined level of opacity, transparency or luster;
a second area of the surface of the fluid-filled bladder element has a second predetermined level of opacity, transparency or luster that is at least ten percent greater than or at least ten percent less than the first predetermined level of opacity, transparency or luster; and
the impression is on at least one of the first area or the second area.

6. The article of footwear of claim 1, wherein:
the first polymeric sheet comprises a multi-layer polymeric sheet that is a laminate membrane having at least a first layer comprising a thermoplastic polyurethane (TPU) and at least a second layer comprising the gas barrier polymer; and
the gas barrier polymer is an ethylene-vinyl alcohol copolymer.

7. The article of footwear of claim 1, wherein the fluid-filled bladder element has a gas transmission rate for nitrogen of less than 10 cubic centimeters per square meter per atmosphere per day, or of less than 1 cubic centimeter per square meter per atmosphere per day.

8. The article of footwear of claim 1, wherein:
said one of the midsole or the outsole has an opening; and
the impression is exposed to view through the opening.

9. The article of footwear of claim 1, wherein the fluid-filled bladder element has an etched feature that is at least partially aligned with the impression.

10. An article of footwear comprising:
an upper;
a sole assembly secured to the upper and including a midsole and an outsole;
wherein:
the midsole includes a fluid-filled bladder element including a first polymeric sheet that has a surface with an impression;
the fluid-filled bladder element further including a second polymeric sheet bonded to the first polymeric sheet at a peripheral seam so that the fluid-filled bladder element defines a sealable internal cavity that retains fluid;
the first polymeric sheet comprises a gas barrier polymer and has a first thickness;
the impression comprises a recess in the surface of the fluid-filled bladder element;
the impression has a maximum depth into the first polymeric sheet of not more than about one-half of the first thickness such that the gas barrier polymer is not compromised by the impression;
a first portion of the fluid-filled bladder element with the impression is exposed to view through one of the midsole, the outsole, or the upper; and
a second portion of the fluid-filled bladder element is blocked from view by said one of the midsole, the outsole, or the upper.

11. The article of footwear of claim 10, wherein:
the impression is spaced apart from the peripheral seam; and
the peripheral seam is covered by and blocked from view by said one of the midsole, the outsole, or the upper.

12. The article of footwear of claim 10, wherein the impression further comprises a protrusion at the surface of the fluid-filled bladder element.

13. The article of footwear of claim 10, wherein:
the first polymeric sheet comprises a multi-layer polymeric sheet that is a laminate membrane having at least a first layer comprising a thermoplastic polyurethane (TPU) and at least a second layer comprising the gas barrier polymer; and
the gas barrier polymer is an ethylene-vinyl alcohol copolymer.

14. The article of footwear of claim 10, wherein the fluid-filled bladder element has a gas transmission rate for nitrogen of less than 10 cubic centimeters per square meter per atmosphere per day, or of less than 1 cubic centimeter per square meter per atmosphere per day.

15. The article of footwear of claim 10, wherein:
said one of the midsole, the outsole, or the upper has an opening; and
the impression is exposed to view through the opening.

* * * * *